Oct. 13, 1931.  J. S. REYNOLDS  1,826,824

MEANS FOR VEHICLE BRAKING

Filed Nov. 3, 1924   2 Sheets-Sheet 1

INVENTOR.
Joy S. Reynolds
BY Bradley L. Benson
ATTORNEYS.

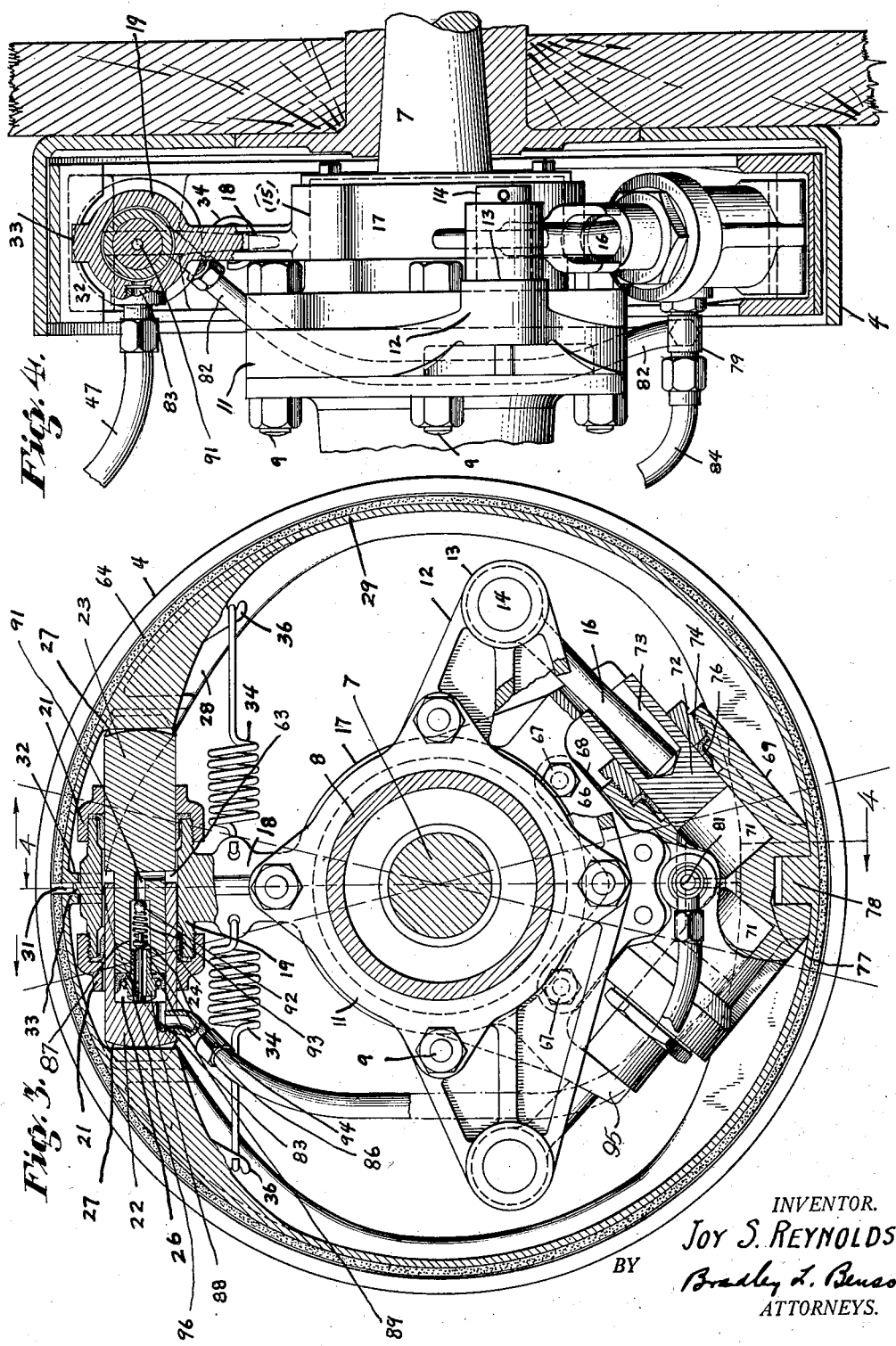

Patented Oct. 13, 1931

1,826,824

UNITED STATES PATENT OFFICE

JOY S. REYNOLDS, OF SAN FRANCISCO, CALIFORNIA, ASSIGNOR, BY MESNE ASSIGNMENTS, OF ONE-HALF TO JOY S. REYNOLDS, OF DETROIT, MICHIGAN, AND ONE-HALF TO CHARLES A. BALCOLM, OF SAN FRANCISCO, CALIFORNIA

MEANS FOR VEHICLE BRAKING

Application filed November 3, 1924. Serial No. 747,628.

The present invention is an improved hydraulic brake for use in braking the wheels of vehicles and vehicle trains.

The objects of this invention include:

The provision of a hydraulic brake of such structure as to render it particularly adaptable for use in four wheel braking of vehicles. The principal object of this invention is to provide a brake mechanism which affords safety in the braking of vehicles wherein brakes are applied to the steering wheels.

A thorough study of the subject in four wheel braking discloses certain problems which have caused manufacturers to hesitate in the adoption of four wheel brakes wherein power is applied manually to the steering wheels of an automobile. For instance, where power is applied to the brake mechanism of the steering wheels manually, and said application is as direct as that applied to the drive wheels, there is grave danger of sliding the steering wheels on the road surface and thus rendering the steering mechanism ineffective.

In the mechanism hereinafter described this application of brakes to the steering wheels is made indirectly from the rear wheels. That is to say, the force utilized to apply brakes on the steering wheels is created by the torque set up by the rear wheel brake application. It results from this structure that brakes can only be applied to the steering wheels after an application has been made to the rear wheels, and that the brakes on the steering wheels will be released simultaneously with the release of these on the drive wheels.

The system is so arranged that only a predetermined proportionate amount of power can be applied to the steering wheels so that, should traction fail on the drive wheels, it will not be possible to lock or slide the front wheels.

Another object of this invention is to provide means for applying the brake mechanism of a steering wheel by the torque created by a brake application on a drive wheel on the opposite side of a vehicle. This is an important feature of my invention as it serves to stabilize the vehicle and, should traction fail on one side, it serves to prevent a gyration of the moving vehicle. By means of this cross-over arrangement, should the moving vehicle encounter a road surface which is slippery on one side only, it would be impossible to get a severe application of brakes on one side and an insufficient application on the other side.

Another object of my invention is to provide means for augmenting a manual brake application on any wheel by utilizing the torque of said application to boost the power applied to the brake mechanism.

I also provide means for transmitting the force thus created from one wheel to the brake mechanism of another wheel and thus relay the power through a series or multiple series as desired.

In this specification and the annexed drawings the invention is illustrated in the form considered to be the best, but it is not limited to such form because it may be embodied in other forms, and it is also to be understood that in and by the claims following the description it is desired to cover the invention in whatever form it may be embodied.

In the accompanying drawings

Figure 3 is a sectional view of a brake drum, and brake band and show means for utilizing the torque of a brake application for the augmentation of said application, and Figure 4 is a section Fig. 3 taken on the irregular line IV—IV.

Figure 1:
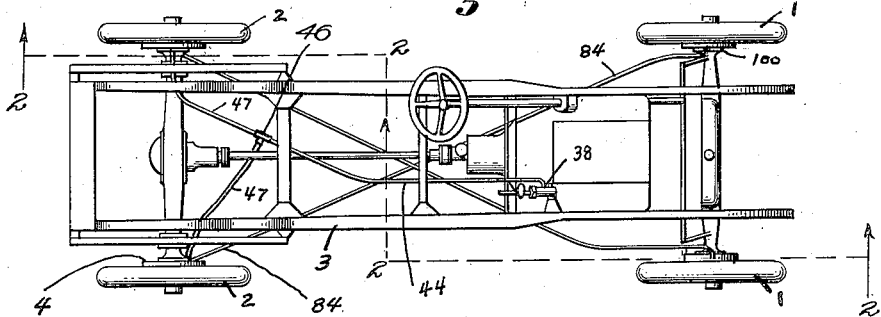
Figure 1 is a diagrammatic top plan view of an automobile chassis.

Referring to the drawings the numeral 1 indicates a steering wheel, and 2 a drive wheel of an automobile chassis 3. At 4 I show a conventional brake drum secured to a drive wheel 6 rotatable on an axle 7. An axle housing 8 surrounds the axle 7 and, secured to a flange on said housing, by bolts 9, is a ring 11 provided with a torque arm 12 on which is a boss 13. Extending outwardly from the boss 13 is a pin 14 on which is oscillatively mounted a connecting rod 16. At 17, in Fig. 3, I show a ring oscillatively mounted on a reduced portion 15 of the axle housing 8. The ring 17 is provided with an arm 18 on the outer extremity of which is a cylinder 19. The ends of cylinder 19 are threaded for engagement with guide nuts 21 through which slide pistons 22 and 23. Piston 23 is reduced, as indicated at 24, and said reduced portion is slidable in a chamber 26 in piston 22. Pistons 22 and 23 are afforded easy clearance in the cylinder 19 and have their bearing in the guide nuts 21, which afford axial alinement of the two pistons in conjunction with the sliding fit of the reduced portion 24 in chamber 26. Pistons 22 and 23 are grooved on their outer ends, as indicated at 27, to engage ends of a central web 28 on an annular brake band 29 of conventional channel type. The brake band 29 is split, as indicated at 31, and is provided with flanges 32, between which flanges extends a lug 33 integral with the cylinder 19. The brake band 29 is normally held in contracted position (indicated in Fig. 2) by means of springs 34 secured at one end to the arm 18 and at the opposite end to lugs 36 on said band.

I will now describe means for making a manual application of the brake drum 29 on the rear wheel, Fig. 1. At 35 I show a conventional foot pedal pivoted at 36 to the chassis. Pivoted at 37 to some stationary part of the chassis I show a cylinder 38 provided with a packing gland 39 through which extends a piston 41, pivotally connected at 42 to the pedal 35. Connected to cylinder 38, as by a union 43, is one end of a pipe 44, the opposite end of which is connected to one leg of a T 46. To the remaining legs of the T 46 are connected pipes 47 extending, laterally therefrom, to the brake mechanisms of the rear wheels. The end of pipe 47 remote from T 46 is connected to the cylinder 19. As pedal 35 is depressed liquid in cylinder 38 is forced, through pipes 44 and 47, into a chamber 63 urging the pistons 22 and 23 to separate. The chamber 63 is formed by the differential areas of the full size and the reduced size of piston 23. Therefore, as fluid enters said chamber pistons 22 and 23 are urged to separate and each exerts a thrust on the webs 28 of the brake band 29, expanding the band 29 and contacting brake lining 64 with the drum 4. The frictional engagement of the brake lining 64 with drum 4 places the arm 18 of ring 17 under urge to rotative movement. As said ring is revolubly mounted on a stationary part (the axle bearing housing) this rotative movement actually takes place in a slight degree and I utilize this movement to create hydraulic pressure for the double purpose of augmenting the braking effect on the wheel in which said pressure is created and transmitting said pressure to the brake operating mechanisms of other wheels. Extending from the ring 17 opposite the arm 18 is a flange 66. Bolts 67 extend through the flange 66 and are provided with easy clearance and are threaded into a flange 68 on a cylinder casting 69. The cylinder casting 69 contains twin cylinders 71. The cylinder and coacting parts are identical and are opposed in order to make them function when the chassis is moved either in a forward or reverse direction. Slidable in cylinder 71 is a piston 72 provided with a bore 73 into which extends that end of connecting rod 16 remote from torque arm 12. The piston 72 is guided at one end by the bore of cylinder 71 and at the opposite end by a threaded bushing 74 which also serves to hold a packing leather 76. It will be seen that connecting rod 16 is prevented from rotative movement (with respect to the axle housing) because of its anchorage on the torque arm 12. The cylinder casting 69 is provided with a notch 77 into which extends a lug 78 integral with the brake band 29. By this means, when a brake application is made and the lining 64 engages drum 4, the rotation of said drum rotates the brake band 29 and moves the cylinder casting 69 and this places liquid in cylinder 71 under pressure. In order to utilize this pressure for two different purposes I provide a T 79, one leg of which is threaded into a passage 81 communicating with both of cylinders 71. To one leg of T 79 I connect a tube 82, the opposite end of which is connected to a port 83 in piston 22. Port 83 communicates with chamber 26 in piston 22. By this means the pressure created in cylinder 71 becomes effective on the area of the reduced portion 24 of piston 23 thereby augmenting the manual operation (in which the effective area is represented by the total cross-sectional area of piston 23 less that of its reduced portion 24). To the remaining leg of the T 79 I attach one end of a pipe 84, the opposite end of which is operatively connected to the brake operating mechanisms of the steering wheel 1, Fig. 1.

The reduced portion 24 of piston 23 is centrally bored and tapped as indicated at 86. When the pressure in chamber 63 subsides, in response to a release movement of lever 35, Fig. 1, the springs 34 retract the end of the brand band 29 forcing pistons 22 and 23 together, thus reducing the volumetric space in chamber 63 and chamber 26. The liquid in chamber 26 is thus displaced and returned through tube 82 to cylinder 71, thus pushing the head of cylinder 71 away from piston 72 and returning it and lever 35 to their normal (released) positions. The liquid in chamber 26 is displaced by the reduced portion 24 of piston 23 and is conducted through pipe 82 to cylinder 71 forcing the cylinder casting 69 to the neutral position, Fig. 2 (the end of the connecting rod 16 remote from arm 12 being abutted against the bottom of bore 73 in piston 72). The release having been effected, all parts are returned to inoperative position shown in Fig. 2 and the brake band is again suspended in concentric relation to the drum and is supported by the ring 17 mounted on the axle bearing housing 8. This is accomplished by reason of the lug 33 which engages and positions the ends of the band 29 and by reason of the lug 78 on said band which is engaged by the notch 77 in the cylinder casting 69.

I will now describe means for replenishing any depletion of liquid in cylinder 71 and the parts of the system directly connected therewith.

The reduced portion 24 of piston 23 is centrally bored, as indicated at 87, and threaded into said bore is a bushing 88, the head of which secures a packing leather 89. The bore 87 is connected by means of a passage 91 with the chamber 63. Passage 91 is closed at one end by a ball check 92 urged to seat by a spring 93, one end of which bears against said ball and the opposite end against a valve 94, the stem of which is fluted, as indicated at 96, and extends through the bushing 88.

Figure 2:
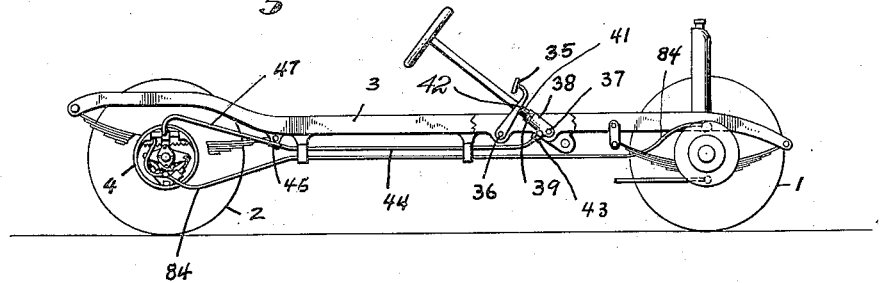
Figure 2 is a vertical cross sectional view of Fig. 1, taken on the irregular line II—II, showing diagrammatically means for carrying out my braking system.

Assuming that the system is charged with liquid and that all parts are in released position shown in Fig. 2. should there be a depletion of liquid in cylinder 71, (which is connected with chamber 26) when a brake application is made and liquid under pressure is admitted to chamber 63, because of the resistance offered by the springs 34 and because the stem of valve 94 abuts the end of the chamber 26 and said valve is prevented from seating, the pressure entering passage 91 acts to unseat ball valve 92 compressing spring 93. This allows the passage of liquid to chamber 26 until the same is filled, at which time pressure will be created in chamber 26 and said pressure will coact with the pressure in chamber 63 to move the pistons 22 and 23 in opposite directions which will allow the spring 93 to expand and seat valve 94 and pressure in the chamber surrounding spring 93 will equalize with that in chamber 63 and the spring pressed ball valve 92 will also be seated thus preventing the passage of liquid in either direction through passage 91 until another depletion occurs and the parts are again in neutral position, at which time the operation will be repeated upon an application of brakes.

I wish to state that in designing the system the proportioning is so calculated that a lesser pressure will exist in chamber 63 than in chamber 26, during a brake application, so that leakage could not increase the volume of liquid in the automatic part of the system (chamber 26 being a part thereof) to an ultimate degree that would overcome springs 34 and prevent the releasing of the brakes. It will now be seen that slight leakage from the automatic to the manually operated parts of the system would be stored in the latter and automatically replenish the automatic part of the system when the next brake application is made.

Referring to the Fig. 1 it will be noted that the pipe 84 connects one rear drive wheel 2 on one side of the chassis with that steering wheel I which is on opposite side of the chassis. This cross-over is for the purpose of stabilizing the braking force on the opposite sides of the car. It often occurs that a vehicle encounters a wet, icy, or otherwise slippery surface on one side of the road. If it becomes necessary to apply the brakes under this condition and the forward wheel on the same side of the vehicle derives its brake application through that of the rear wheel on the same side of the vehicle, the center of weight of the vehicle is momentarily offset and there is an urge to gyration (with that side which has traction as a pivot). This is a very common cause of accidents.

By means of the cross-over arrangement of pipe 84 a front wheel is stabilized by a rear wheel on the opposite side of the chassis and the center of weight is equidistant between the wheels on either side, thus eliminating any tendency to gyrate or side-swipe.

Assuming that an application of brakes is made and the frictional engagement of brake band 64 with drum 4 imparts rotative movement to cylinder casting 69, the entire assembly shown in Fig. 2 will be rotated in a counter-clockwise direction. Because of the unity of the cylinder casting 69, the ring 17, the arm 18 and the cylinder 19, and because of the rotatable mounting thereof (the torsion arm 12 being stationary and the connecting rod 16 being connected thereto) that piston 72 which is shown in section, Fig. 3, is prevented from moving from the neutral position shown in Fig. 2 toward the torsion arm 12, and, as the other piston 72 abuts the bifurcated end of an arm 95 integral with ring 17, it will be seen that the movement of the casting 69 carries that piston 72 which is shown in full lines, Fig. 3, therewith, and rod 16 will be partly withdrawn from its bore 73. At the same time the bifurcated end of the opposite arm 95 moves with the cylinder casting 69 and away from piston 72 and the piston is forced into the cylinder 71 displacing liquid through port 81 to a passage connected with T 79, one leg of which delivers liquid to tube 84, Fig. 3, which is connected at the opposite end with the expanding unit 100, Fig. 2, operating the front wheel brake in a degree that is in exact ratio to the torsion produced on the band of the rear wheel. At the same time that leg of T 79 connecting with one end of tube 82 supplies liquid transmitted through tube 82 (the opposite end of which is connected to piston 22) to the chamber 26, exerting pressure (on the area of the bore in piston 22) in an outward direction on piston 22 and in the opposite direction on the reduced end of piston 23. It will now be seen that the conection of cylinder 71 and chamber 26, hydraulically, serves to act as a booster by coacting with the manual power applied in chamber 63. When the vehicle is moving in a reverse direction the action is the same, but the movement of the twin pistons 72 is reversed.

I claim:

1. A brake mechanism for a wheel of a vehicle comprising a brake band for braking said wheel, and hydraulic means, responsive to the torque created by an application of the band, for augmenting the brake effect thereof.

2. A brake mechanism for a wheel of a vehicle comprising manually controlled means for braking said wheel and hydraulic means, responsive to the torque created by the application of said manual braking means, for augmenting the power applied through said manually controlled means.

3. A brake mechanism for wheels of a vehicle comprising means for braking one of the said wheels, a hydraulically actuated unit for operating the brake, a brake mechanism for each of the remaining wheels of the vehicle, automatic means responsive to the torque created by the application of the first named braking means for augmenting the power applied to the hydraulically actuated unit, and means for transmitting the power applied to said unit to the brake mechanism of another wheel.

4. The combination with a brake drum and a brake band and means for expanding said band to engage said drum, of hydraulic means, responsive to the frictional engagement of said band with said drum, for augmenting said frictional engagement.

5. The combination with a brake drum and a brake band and means for expanding said band to engage said drum, of means, responsive to the frictional engagement of said band with said drum, for creating hydraulic pressure, and means for applying said pressure to the expanding means.

6. In a brake mechanism, a brake drum, a movable braking element, means for moving the element to braking engagement with the drum, and hydraulic means utilizing the tortional force created by engagement of the element with the drum to augment the force applied in the initial moving of the element.

7. In a brake mechanism for a wheel provided with a brake drum, an oscillatively mounted floating brake band, means associated with said floating band for creating pressure in response to the engagement of said band with said drum, and means for applying said pressure to said band and thereby augmenting its frictional engagement with said drum.

8. In brake mechanism, a brake drum, a brake element movable to engagement with the drum, hydraulic means for causing engagement of the brake element with the drum, and hydraulic means functioning by reason of engagement of the element with the drum to increase the original force applied to cause the engagement.

9. In a brake mechanism for a wheel provided with a brake drum, an oscillatively mounted floating brake band, hydraulic means associated with said floating band for creating pressure in response to the engagement of said band with said drum, and hydraulic means for applying said pressure to said band and thereby augmenting its frictional engagement with said drum.

10. A braking system for vehicle wheels, each of which is provided with a drum and a braking element, of manually controlled means for causing engagement of the braking element for one of the wheels with its drum, and means for utilizing the tortional force created by the said engagement to apply pressure to the said braking element and to the braking element of another wheel.

11. In a hydraulic brake, the combination with a brake drum, of a brake band therefor, hydraulically operated means including a fluid containing chamber for causing engagement of the band with the drum, said band being mounted to turn with the drum on frictional engagement therewith, means whereby the turning of the band with the drum causes pressure on the said fluid in the chamber resisting rotation of the band, and a conduit leading from the said chamber by means of which fluid under pressure may be transmitted to another instrumentality.

12. In a hydraulic brake, the combination with a brake drum, of an internal expansible brake band adapted to turn to a limited extent with the drum when in engagement therewith, an expander operable by hydraulic pressure to set the band, said expander having a chamber for fluid, and means whereby the turning of the band with the drum increases the pressure exerted upon the fluid in the chamber.

13. The combination with a brake drum and brake band of a vehicle wheel and means for expanding said band to engage the said drum, of leverage means within the drum responsive to the frictional engagement of the band with the drum for creating hydraulic pressure, and means for applying said hydraulic pressure produced by the leverage means to operate another brake unit.

14. In a brake mechanism for a wheel provided with a brake drum, an oscillatively mounted floating brake band for the drum, means within the drum associated with said floating band for creating pressure in response to the engagement of the said band with the drum, a second similar brake mechanism for another wheel and means for applying the said pressure of the first brake mechanism to the second brake mechanism.

15. In a brake mechanism for a wheel provided with a brake drum, an oscillatively mounted floating brake band for said drum, manually controlled hydraulic means within the drum associated with the said floating band for creating pressure in response to the engagement of the band with the drum, and means for applying said pressure to actuate another brake device.

16. In a brake mechanism for the wheel of a vehicle provided with a brake drum, an oscillatively mounted floating brake band, manually controlled hydraulic means within the drum associated with said floating band for creating hydraulic pressure in response to the engagement of the band with the drum, and means for transmitting said pressure to a distance.

17. A hydraulic brake for a vehicle wheel provided with a brake drum comprising a floating band adapted to frictionally engage the same, said band having a limited oscillative movement, manually controlled hydraulic means for frictionally engaging said band with the drum, automatic means within the drum responsive to movement of the band when engaged therewith for creating hydraulic pressure, and means for transmitting said pressure to a distance.

18. A hydraulic brake for a vehicle wheel provided with a brake drum, comprising a floating band adapted to frictionally engage the drum, said band being adapted to turn with the drum to a limited extent in its direction of rotation, manually controlled hydraulic means for causing frictional engagement of the band with the drum, automatic means within the drum responsive to the movement of the band when in engagement with the drum for creating hydraulic pressure, a second similar brake mechanism for another wheel and means operable by said automatic means for setting the second brake mechanism.

19. A hydraulic brake for the wheel of a vehicle comprising a liquid supply source, said wheel having a drum and a band adapted to frictionally engage the same, manually controlled means for causing frictional engagement of the band with its drum, said band being adapted to turn with the drum in its direction of rotation to a limited extent, automatic means responsive to the movement of a band when so engaged for creating hydraulic pressure, a second similar brake mechanism for another wheel, means for applying the pressure to set the second brake, and means responsive to operation of said manually controlled means for automatically replenishing depletion of liquid in the said automatic means and connected brake setting mechanism from the said supply source.

20. A hydraulic brake mechanism for the two forward and two rear wheels of a vehicle comprising a hydraulically actuated braking unit for each of the wheels, each rear brake unit comprising a drum, a band for the drum, a hydraulic unit adapted upon application of pressure to cause engagement of the band with the drum, manual means for applying pressure thereto, and a conduit extending from the unit of one rear wheel on that of a forward rear wheel on the respective opposite side of the vehicle for transmitting pressure to the braking unit thereof.

21. In brake mechanism for the wheels of a vehicle, a brake drum for a wheel, an oscillatively mounted floating brake band for the said drum, means associated with the said band for creating pressure in response to engagement of the band with the drum when rotated in either direction, a second braking unit for another wheel and means for applying the pressure created by the first brake mechanism to the second braking unit.

In testimony whereof I affix my signature.

JOY S. REYNOLDS.